H. J. SCHMICK.
METHOD OF AND MEANS FOR GENERATING MECHANICAL ELEMENTS.
APPLICATION FILED DEC. 11, 1919.
1,392,528.
Patented Oct. 4, 1921.
3 SHEETS—SHEET 1.
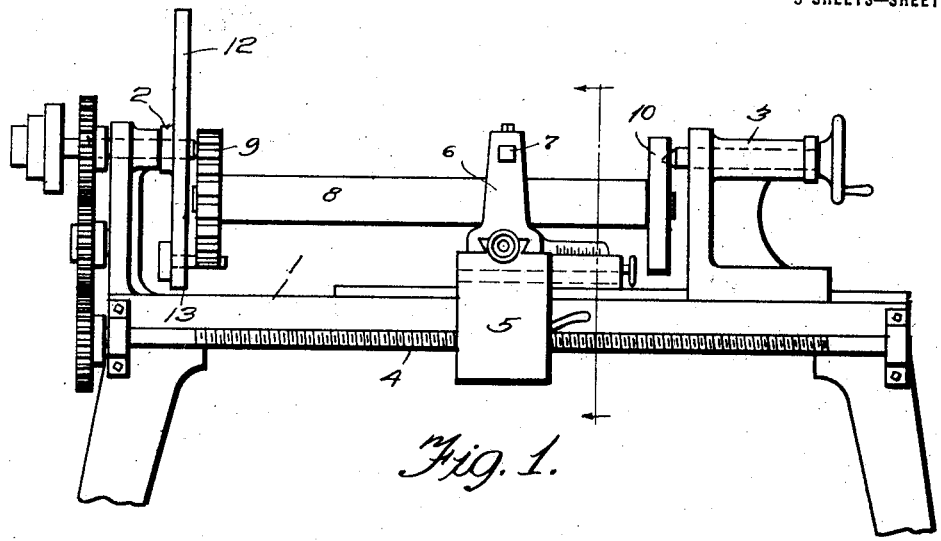
Fig. 1.
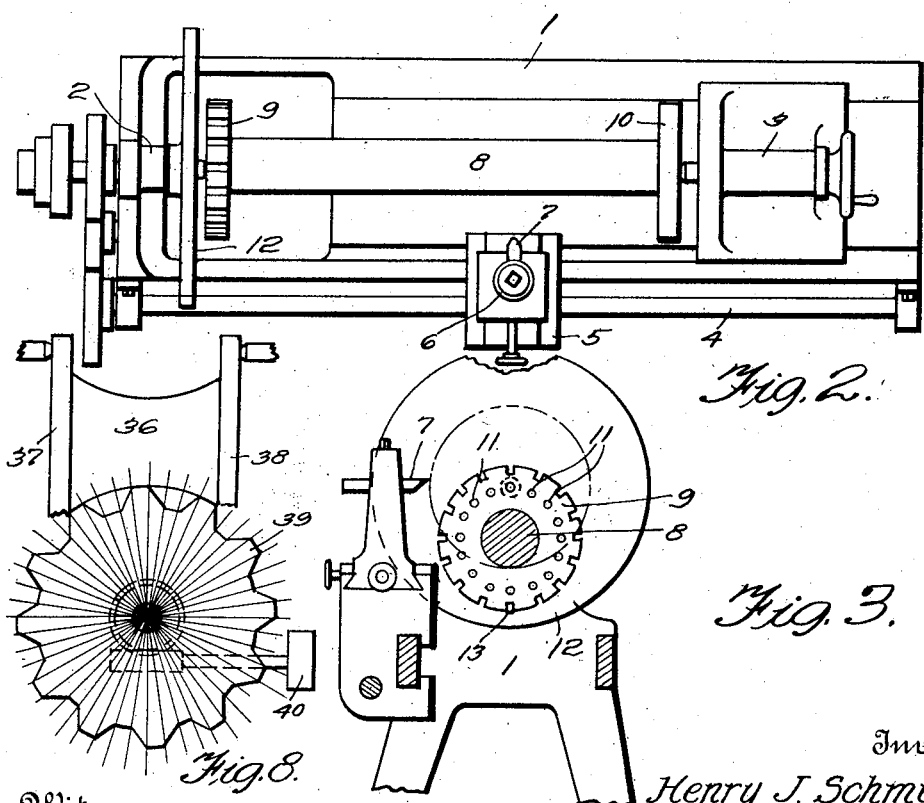
Fig. 2.
Fig. 3.
Fig. 8.
Witnesses
Inventor
Henry J. Schmick,
By Gould & Gould
Attorney

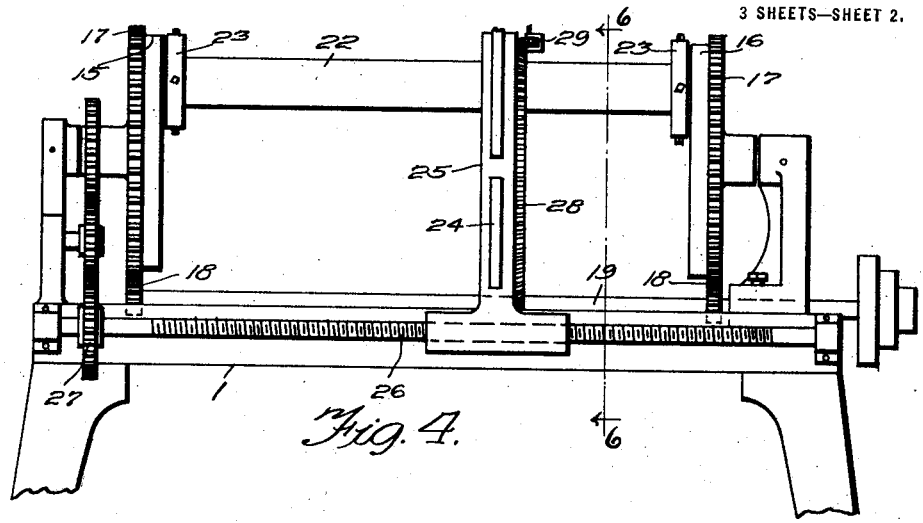
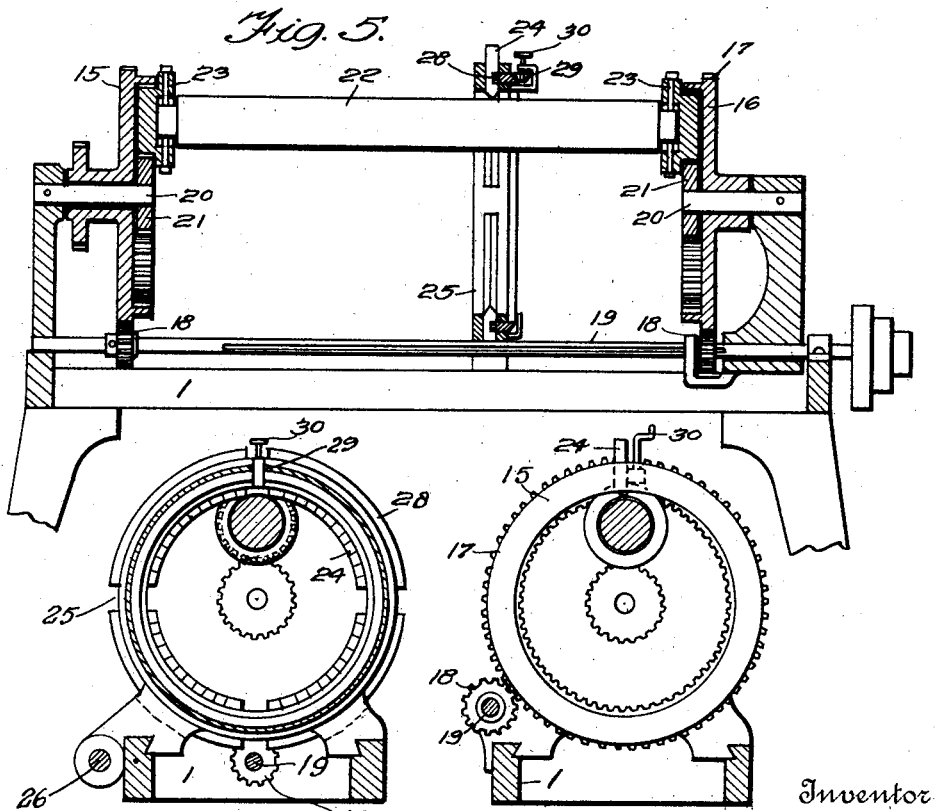

H. J. SCHMICK.
METHOD OF AND MEANS FOR GENERATING MECHANICAL ELEMENTS.
APPLICATION FILED DEC. 11, 1919.
1,392,528.
Patented Oct. 4, 1921.
3 SHEETS—SHEET 3.
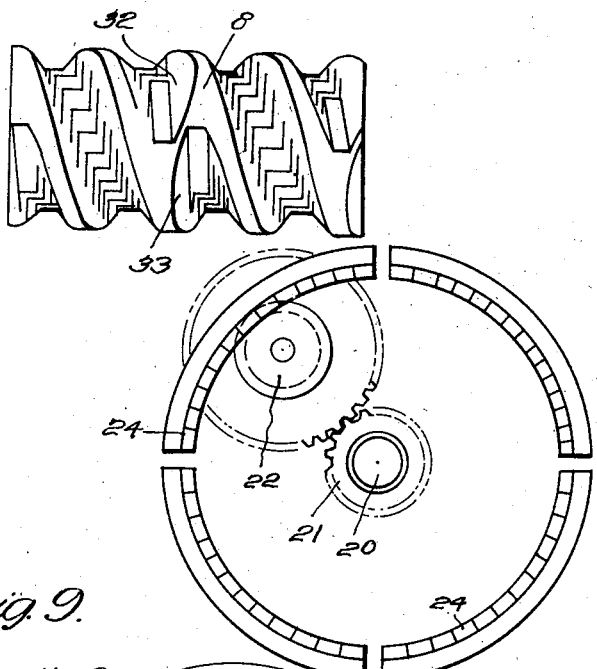
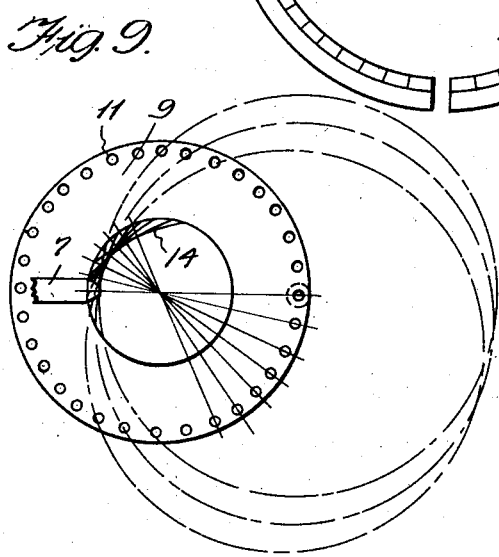
Inventor
Henry J. Schmick,
By Gould & Gould
Attorney

UNITED STATES PATENT OFFICE.

HENRY J. SCHMICK, OF WILLIAMSPORT, PENNSYLVANIA, ASSIGNOR TO SCHMICK SCREW AND GEAR COMPANY, OF WILMINGTON, DELAWARE, A CORPORATION OF DELAWARE.

METHOD OF AND MEANS FOR GENERATING MECHANICAL ELEMENTS.

1,392,528.  Specification of Letters Patent.  Patented Oct. 4, 1921.

Application filed December 11, 1919. Serial No. 344,265.

*To all whom it may concern:*

Be it known that I, HENRY J. SCHMICK, a citizen of the United States, residing at Williamsport, in the county of Lycoming and State of Pennsylvania, have invented certain new and useful Improvements in Methods of and Means for Generating Mechanical Elements, of which the following is a specification.

This invention relates to an improvement in machines for generating mechanical elements for the transmission and transformation of power, as screw-threads, worms, gears, cams and the like.

The principle involved in the present invention is that of generating the element through the production of a successive series of eccentric surfaces, formed in planes substantially at right angles to the axis of the blank, and so related as to merge on non-radial lines to produce a working face or faces of particular type, to thereby materially increase the efficiency of the element produced as compared with the present type of similar element.

The preferred mode of practising the invention contemplates providing apparatus wherein the blank is so directed and controlled and the coöperating cutter so related to the blank, that in operation the desired formation of element will necessarily result.

In the drawings:

Figure 1 is a view in elevation of a simple type of a suitable machine for practising the invention;

Fig. 2 is a plan view of the same;

Fig. 3 is a section on the line 3—3 in Fig. 1, looking in the direction of the arrows, showing the mounting of the blank;

Fig. 4 is a side elevation of a continuous feed type of machine constructed in accordance with the present invention;

Fig. 5 is a longitudinal section of the same;

Fig. 6 is a transverse section of the same on the line 6—6 in Fig. 4;

Fig. 7 is a transverse section similar to Fig. 6 of a modified form of machine having a single cutter.

Fig. 8 is a diagrammatic view illustrative of a generating operation for a worm;

Fig. 9 is a diagrammatic view illustrative of the generating movement of a cutter, as shown in Fig. 1;

Fig. 10 is a diagrammatic view illustrative of a generating movement of a cutter as shown in Fig. 4; and Fig. 11 is a view of the partially completed blank made by operation of the machine of Fig. 1.

The invention is here shown embodied in machines for the generation of screw threads, but it is to be understood that the principle involved is equally applicable to the generation of other elements of similar character.

In Figs. 1, 2, and 3, a simple single cutter type of machine is illustrated, comprising a frame 1 similar to that of a lathe having the ordinary driven head stock 2, and tail stock 3. The feed screw 4 for the traveling cutter head support or block 5 is driven by gears from the head stock in the usual or any desired way, and the cutter head 6 is adjustable lengthwise and crosswise on said block as usual.

For the performance of the present invention in this type of machine, it is desirable to give the blank an eccentric movement relative to the cutter 7, and for this purpose the blank 8 is mounted on a spindle having disk heads 9 and 10. The disks are formed with a concentric series of openings 11, hereinafter termed centers, arranged near the peripheral edges of the disks. These centers provide a series of centers of rotation of the blank, and are to successively engage with the head and tail stock center pins, as shown diagramatically in Fig. 9. The head stock carries a face plate or disk 12, having near its peripheral edge a pin or other suitable engaging member 13, adapted to enter an appropriate notch in the adjacent spindle disk 9, to thereby fix the disk against independent movement and insure the eccentric rotation of the blank 8.

In this type of machine, as will be plain from Fig. 9, the cutter may be adjusted to suit the blank and is maintained throughout the operation at the same angle, preferably a direct right angle to the axis of the blank. When the blank is rotated it is given an eccentric movement relative to its axis to bring a single segment into engagement with the cutter in each turn of the lathe. Of course it is understood that following each cutting engagement the cutter 14, if held fixed during the cutting operation, is indexed manually to offset the next segmental cut axially with reference to the preceding cut. If the cutter is fed by the screw, as shown in Figs. 1, 2 and 3, each revolution of the blank will produce a similar segmental cut or eccentric formation at successive predetermined points in the feed of the screw, and following each of which cuts the lathe is stopped and the blank given a new relative position by causing the lathe centers to engage in the next pair of alining blank centers 11. If the cutter is held stationary instead of being fed by the lead screw it is manually indexed between each cut to give the lead or offset to the next eccentric formation, and the operation is thus continued. Fig. 11 illustrates the partially complete blank produced by a machine similar to that shown in Figs. 1, 2 and 3, and will be later described in more detail.

In Figs. 4 to 7 inclusive is shown a continuously operating machine having a plurality of cutters, and this is a preferred type of machine. In this type, the head and tail stocks 15 and 16, are in the form of internal gear members, having also external driving gears 17, adapted to be engaged and operated by pinions 18 on a power shaft 19. The shaft supports 20 of the head and tail stocks are provided with fixed pinions 21, and the blank 22 is supported in end members 23, formed as pinions held between the rotating internal gears 16 and 15 and the pinions 21. In this type the cutter may be a single cutter as shown in Fig. 7 or preferably made up in a series, 24, mounted in a ring 25, surrounding the path of travel of the blank, and slidably mounted on the bed. The ring engages with a feed screw 26, driven through gears 27, whereby the cutter ring may be properly fed.

The cutters are preferably mounted for radial adjustment in the ring, so as to provide for increased cutting depth as the work proceeds; and for this purpose, the cutters are made in four sections as shown in Fig. 10, and are fed inwardly or outwardly radially of the ring by a positioning cam member 28, operated at will through gear connections 29, controlled by a hand operated turning member 30. In this form of structure, the eccentric movement of the blank relative to the cutter is carried out, exactly as in the preferred form, as is clearly apparent in Fig. 10.

Assuming now the successive cuts or eccentric formations, each slightly offset in the direction of travel, and each substantially at right angles to the axis, it becomes at once apparent that to produce a continuous thread or other element there must be a sufficiently close spacing of the cuts to effect the merger of their remaining portions. It is believed that this will be particularly apparent from Fig. 11 of the drawings. The lines indicated at 31 clearly show the successive eccentric formations resulting from the closely spaced cuts, and it is apparent that from the successive axial offsetting of the spaced eccentric formations remaining and from the further fact that each one is at substantially a direct right angle to the axis of the blank, it results that the bottom of one formation gradually merges in the side of a succeeding formation, until the bottom line of one eccentric formation may finally become the top of a succeeding formation. This merging is most clearly seen in Fig. 11, wherein the formation is not fully completed. Here it is apparent that one side of a cut or formation, as 32, is directly an extension of the opposite side 33 of a former formation. Of course these formations merge finally into a thread like formation having any pitch desired; but this does not change the relative disposition of the operating faces, and the resultant formation comprises a continual crossing of its line of direction by the successive cuts, as indicated by the faces 32 and 33 of Fig. 11 and a continually advancing series of lines of intersection or merger of their respective faces with the top and the bottom of successive formations.

In Fig. 8, the same principle of eccentric generation is applied to the formation of a worm. The blank 36, exteriorly shaped, is mounted for the eccentric movement described, on disks 37, 38, and cut by a gear cutter 39, indexed by means 40. The cutter is or may be generated initially by the present method, and then used to form the worm.

Having thus described the invention, what is claimed as new is:—

1. A method of generating mechanical power transmitting elements of the continuously rotating type, consisting in rotating the blank element upon its axis and swinging it through a path eccentric to the cutter, and uniformly changing the relative positions of said blank element and cutter while maintaining the cutter at the successive cutting points substantially at right angles to the axis of the blank during each cut.

2. A method of producing articles of the character described by taking successive eccentric cuts axially and circumferentially spaced on a suitable blank by means of a tool operating substantially at right angles to the axis of the blank, the spacing and eccentricity of said cuts being such as to cause them to merge in a continuous groove.

3. A method of producing articles of the character described from a suitable blank by a series of segmental cuts taken transversely of the axis of the blank and spaced axially and circumferentially to form a groove of greater pitch than the angle made by said cuts with a plane at right angles to the axis.

4. A mechanical element generating machine comprising head and tail stocks, and means for supporting a blank relative to such stocks so as to travel in a path eccentric to itself.

5. A generating machine comprising centers, a blank support having a plurality of centers concentric with the blank and adapted to be successively engaged with the machine centers, and a cutter held at right angles to the axis of rotation of the blank.

6. A generating machine including rotating means for supporting a blank to be operated upon and means for successively changing the center of rotation of the blank supporting means, a cutter held at right angles to the blank and intercepting the path of travel of the blank at one point therein, and means for imparting a relative indexing movement to the cutter and blank between cuts whereby successive cuts are displaced circumferentially and axially with reference to one another.

7. Apparatus for producing articles of the character described comprising means for mounting a suitable blank for rotation about a center eccentric to its axis, means for holding a suitable cutter in position to engage a portion of the periphery of said blank and cut a segment therefrom, and means for displacing said cutter and blank axially and circumferentially between successive cuts whereby they merge to form a winding groove.

8. Apparatus for producing articles of the character described comprising means for mounting a suitable blank for rotation about a center eccentric to its axis, means for holding a suitable cutter in position to engage a portion of the periphery of said blank and cut a segment therefrom, means for shifting the center of rotation and maintaining the eccentricity of said blank, and means for displacing said cutter and blank axially between successive cuts whereby they merge to form a winding groove.

In testimony whereof, I affix my signature.

HENRY J. SCHMICK.